April 27, 1937.    H. F. FLOWERS    2,078,915
TANDEM WHEELED TRUCK
Filed April 10, 1935    5 Sheets-Sheet 1

Inventor:
Henry Fort Flowers,
By Mason & Porter
Attorneys

April 27, 1937. H. F. FLOWERS 2,078,915
TANDEM WHEELED TRUCK
Filed April 10, 1935 5 Sheets-Sheet 3

Inventor:
Henry Fort Flowers,
By Mason & Porter
Attorneys.

April 27, 1937. H. F. FLOWERS 2,078,915
TANDEM WHEELED TRUCK
Filed April 10, 1935 5 Sheets-Sheet 4

Patented Apr. 27, 1937

2,078,915

UNITED STATES PATENT OFFICE 2,078,915

TANDEM WHEELED TRUCK

Henry Fort Flowers, Findlay, Ohio

Application April 10, 1935, Serial No. 15,682

29 Claims. (Cl. 105—179)

The invention relates to new and useful improvements in tandem wheeled trucks for cars or the like, and means for attaching the underframe of the car thereto.

An object of the invention is to provide a truck frame which is composed of members joined so as to provide a box-like structure having spaced projecting side members carrying the spindles on which the wheels are mounted in tandem.

A further object of the invention is to provide a truck frame of the above type having spaced parallel side members connected by top and bottom members which extend substantially from end to end of the side members and are bifurcated at their outer end portions so as to provide clearance space for the wheels.

A still further object of the invention is to provide a truck of the above type wherein the wheels are provided with anti-friction bearings clamped to the hub of the wheels so that the wheels and assembled bearings may be attached to or removed from the truck frame by inserting or removing the supporting spindles.

A still further object of the invention is to provide a truck frame of the above type with a supporting means for a cradle which is adapted to receive a pivot post depending from a bolster, which cradle is so mounted on said truck frame as to permit said truck frame to oscillate about a horizontal axis and in a vertical plane extending longitudinally of the truck frame.

A still further object of the invention is to provide means of the above type for supporting the bolster on the truck frame wherein the depending pivot post and cradle are so connected and constructed as to provide a substantially closed chamber for housing the cushioning springs, which chamber is adapted to be partly filled with a lubricating oil for lubricating the movable contacts between the parts and for forming an air cushion between the bolster and the truck.

A still further object of the invention is to provide a bolster carrying depending pivot posts for the opposed trucks, wherein said bolster is constructed so as to provide a hollow rigid girder extending from one side of the car to the other and rigidly connected to the underframe of the car so as to maintain said pivot posts in parallelism and the longitudinal axes of the trucks associated therewith in vertical planes.

These and other objects will in part be obvious and will in part be hereinafter more fully disclosed.

Figure 9:
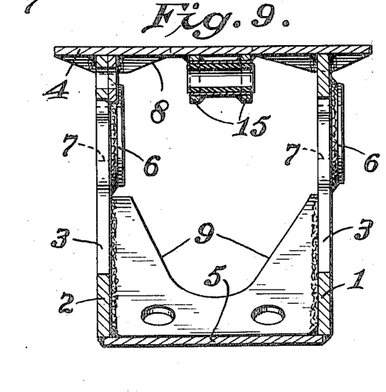
Fig. 9 is a sectional view on the line 9—9 of Fig. 6.

The invention has to do with a truck frame on which the wheels are mounted in tandem and is directed particularly to the construction of the truck frame, the mounting of the wheels on the truck frame and the construction of the body bolster and the means for connecting the same to the truck frames. There are four independent truck frames for each car. They are arranged in pairs adjacent the ends of the car and the opposed truck frames are connected by a tie bar. These truck frames are all similarly constructed and the description of one will serve for the others. The construction of the frame is shown in detail in Figures 6 to 9. Each truck frame includes side members 1 and 2 which are cut away as indicated at 3 in order to lighten the frame. Extending from one side member to the other is a top plate 4 which projects beyond the side members and extends substantially from one end thereof to the other. Also secured to the side members is a bottom plate 5. This bottom plate, as shown in Fig. 9, terminates at the side members. This produces a frame structure which is hollow. The frame structure may be cast in one piece, but is preferably formed of rolled steel plates which are welded together to form an integral structure. The side members 1 and 2 project slightly beyond the ends of the top and bottom plates and have spot-faced machined ends 6, 6 provided with openings 7, 7. The openings 7, 7 at one end of the frame are in alinement and adapted to receive the spindle on which the wheel is mounted. The openings 7, 7 at the other end of the truck frame are also in alinement and adapted to receive the spindle for the other wheel.

The top plate 4 is bifurcated at its opposite ends as indicated at 8. The bottom plate 5 is also bifurcated at its opposite ends as indicated at 9. This provides clearance space in which the respective wheels are mounted and free to turn.

The top plate 4 is provided with an opening 10 and attached to the top plate adjacent said opening is a collar 11 having a projecting flange 12. Extending from one side frame to the other are strengthening partition plates 13, 13. Also extending from one side frame to the other is a curved supporting plate 14. These partition plates and the supporting plate 14 are likewise preferably made of rolled steel and are secured together and to the side frame members by welding. The truck frame is provided with brake hanger supports 15, 15 which are disposed adjacent the respective wheels.

As above noted, the wheels are mounted on sprindles carried by the truck frame and there is no axle extending from the wheel at one truck frame to the wheel at the opposite side of a car. The wheels are all similarly mounted. The wheels are indicated at 16. Each wheel is provided with a hub 17 and disposed within the hub is an anti-friction combined radial and thrust bearing 18 and also a roller bearing 19. Between the bearings are spacing rings 20. The bearings and the spacing rings are all clamped to the hub of the wheel by the holding plate 21 which is secured thereto by bolts 22. The outer races of the bearings serve the purpose of the conventional journal box. The inner races of the bearings are adapted to fit a spindle 23 which extends through the openings 7, 7 in the truck frame. This provides a wheel mounting wherein the bearing for the wheel is attached to the hub and the wheel may be removed from the truck frame by turning off the nut 24 and knocking out the spindle. Another wheel with its assembled bearing can be placed in the frame and the spindle inserted. The detail construction of the bearing for the wheel will not be described more in detail, as it forms the subject-matter of a co-pending application Serial No. 15,683, filed of even date herewith.

Figures 10, 11, 12, 13, 14, 15, 16, 17:
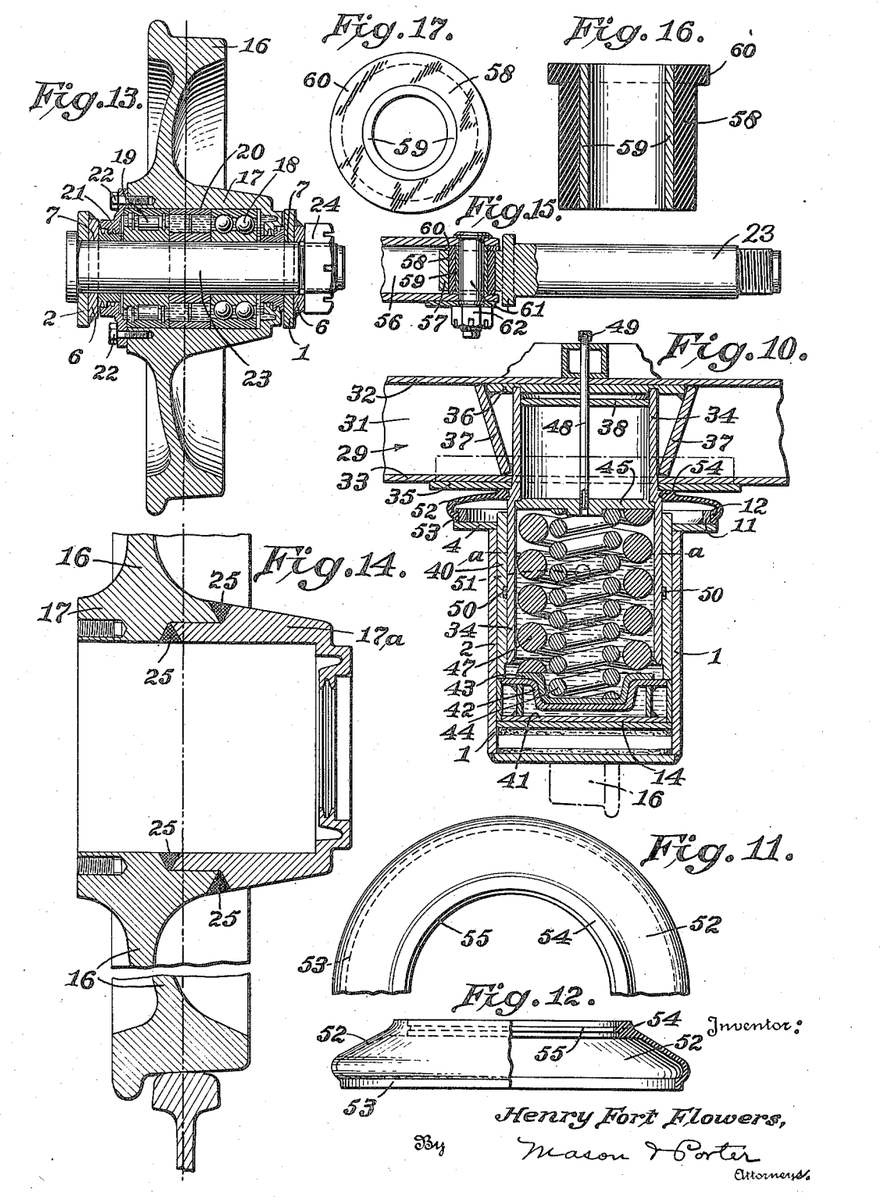
Fig. 10 is an enlarged sectional view centrally of the bolster and through the truck frame and supporting means which is interposed between the truck frame and the bolster.
Fig. 11 is a plan view of a portion of the dust guard which connects the truck frame to the pivot post.
Fig. 12 is a view partly in side elevation and partly in section of said dust guard.
Fig. 13 is a transverse sectional view through one of the wheels and the truck frame.
Fig. 14 is an enlarged vertical sectional view through a portion of the wheel showing a modified construction of wheel hub.
Fig. 15 is a view partly in section and partly in side elevation of the tie bar and coupling for connecting the truck frames.
Fig. 16 is a vertical sectional view through the tie bar bushing.
Fig. 17 is a plan view of the same.
Figure 18:
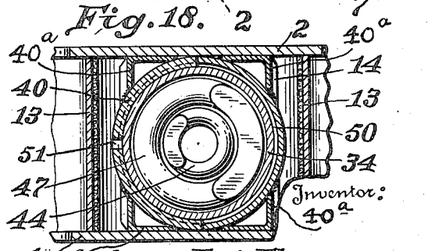
Fig. 18 is a horizontal sectional view through a portion of the truck frame, the cradle and the pivot post with the springs in plan.

As shown in Fig. 14 of the drawings, the hub of the wheel 16 is made in two parts. The inner portion 17 of the hub is formed integral with the wheel, while the outer portion 17a of the hub is formed separately and is attached to the other portion 17 by welding as indicated at 25, 25. These hub portions have telescoping connections, and when welded, it will form a very strong and efficient wheel hub.

Figure 3:
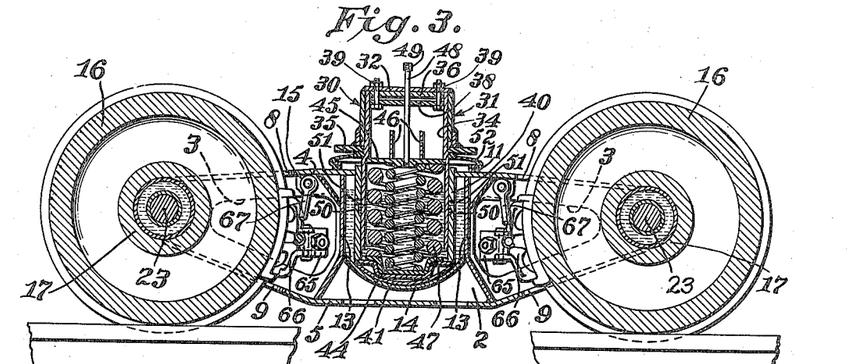
Fig. 3 is a vertical sectional view centrally through one of the wheel trucks and the bolster and the connection between the bolster and the truck.
Figure 4:
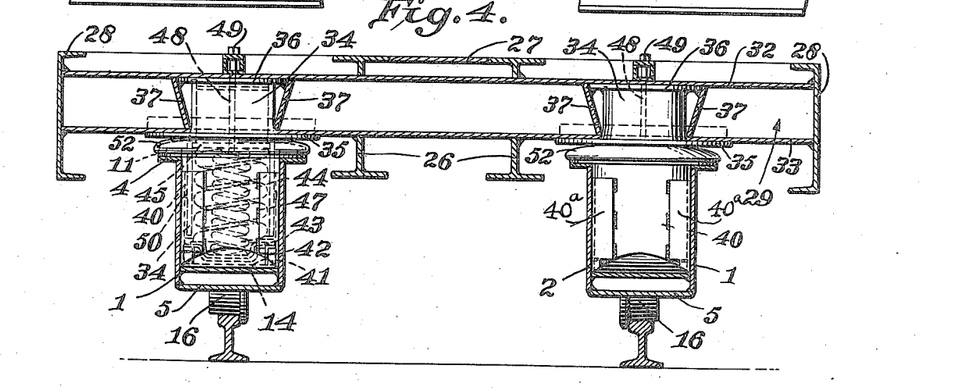
Fig. 4 is a vertical sectional view transversely through the underframe and centrally of the body bolster and showing in broken lines the supporting means between the wheel truck and the bolster.
Figure 5:
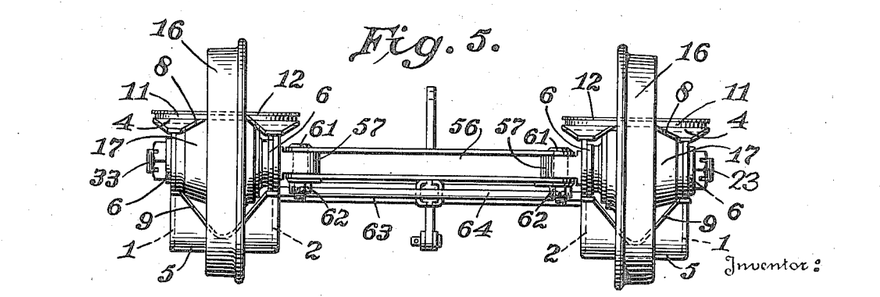
Fig. 5 is a front view of the connected wheel trucks.
Figure 6:
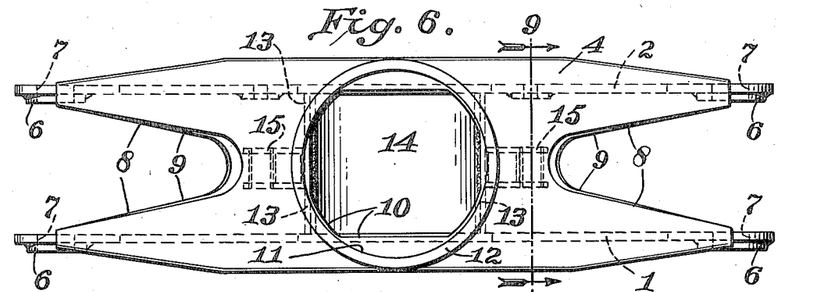
Fig. 6 is a plan view of the truck frame with the spindle removed and the wheels disconnected.
Figure 7:
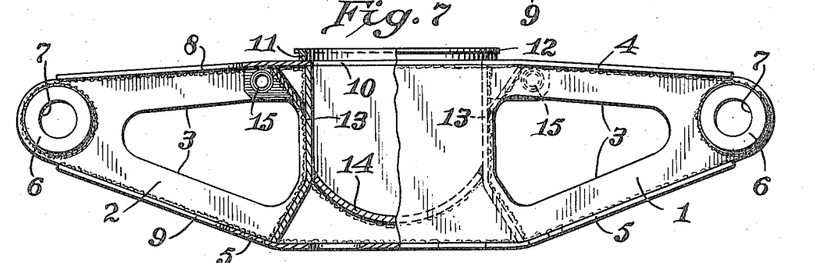
Fig. 7 is a view partly in side elevation and partly in vertical section through the truck frame.
Figure 8:
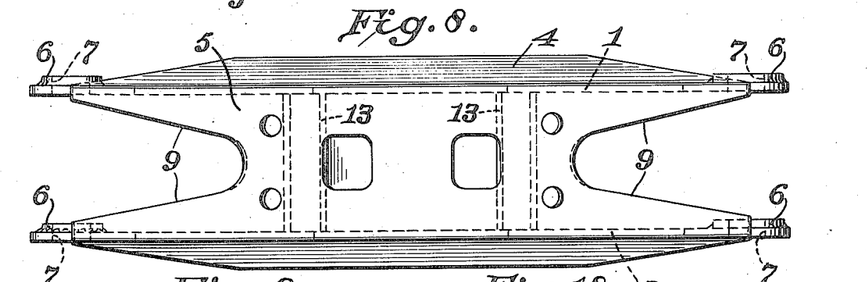
Fig. 8 is a bottom plan view of the truck frame.

The underframe of the car will not be described in detail. It preferably includes a center sill 26 formed of spaced I-beams connected by an inserted plate 27 which is welded thereto. At each side of the car is a side sill 28, 28. Adjacent each end of the underframe is a bolster 29. The bolster consists of side plates 30 and 31 (see Fig. 3) which are joined at their upper edges by a top plate 32 and at their lower edges by a bottom plate 33. These plates are preferably of rolled steel and are welded together to form an integral box-like girder which extends from one side sill 28 to the other side sill 28, and is welded thereto. The I-beams of the center sill are preferably formed with openings so that the bolster may extend through the center sill substantially fitting the openings, and is welded to the I-beams where the bolster contacts therewith. This provides a very strong bolster which is an integral part of the underframe structure, extending from one side thereof to the other. It will be understood, however, that from certain aspects of the invention, the bolster may be otherwise constructed and otherwise arranged relative to the center sill and side sills, but it is essential that it shall be hollow and integral in cross section in order to produce a very rigid bolster.

Depending from the bolster are hollow pivot posts which are rigidly attached thereto. These pivot posts and the mounting of the same in the trucks are similar in construction and the description of one will answer for the others. The pivot post which is indicated at 34 is tubular. There is an opening formed in the lower plate 33 to receive the tubular shank portion of the pivot post, and at the under side of the bottom plate 33 is a strengthening plate 35 which is preferably welded thereto and reinforces the same so as to avoid the weakening of the bolster by the cutting through of the bottom plate to receive the shank of the pivot post. Secured to the under side of the top plate 32 is a reinforcing plate 36. There are also struts 37, 37 extending from the bottom plate adjacent the opening therethrough to the top plate 32. These parts are all welded together so as to make a very strong support for the pivot post. The parts are preferably machined and the pivot post is machined so that it will fit nicely within the bolster with the upper end of the pivot post contacting with the under face of the plate 36. Said plate is preferably grooved to receive the end wall at the top of the pivot post.

There is a cross plate 38 within the pivot post which is welded thereto and when the pivot post is inserted in the bolster, it is secured therein by clamping bolts 39, 39. This provides a ready means whereby the pivot post may be detached and replaced by another pivot post when found necessary. It is understood, however, that other ways may be provided for attaching the pivot post rigidly to the bolster.

The pivot post projects some distance below the bolster and is adapted to fit within the cradle or body supporting member 40. This cradle consists of a cylindrical body portion which is machined on its inner face so as to have a frictional fit with the pivot post on which it may turn about a vertical axis, or the pivot post may slide vertically therein. Attached to the outer face of the body portion 40 are angle plates 40a, 40a, which are welded to the body portion and extend longitudinally thereof. These angle plates provide parallel walls which contact with the inner faces of the side frame members 1 and 2. This will prevent the truck from turning about a vertical axis on the cradle. The lower end of the cradle is closed by a curved plate 41. This curved plate is shaped to conform to the supporting plate 14 and rests thereon. The curved plate is of less length than the supporting plate 14. Mounted within the cradle is a seating plate 42 for the springs. This seating plate and the curved plate 41 are connected by suitable struts, and the plates and struts are welded together so as to form a very strong seat for the springs. The plate 42 has a central depression and fitting within said depression is a movable spring seating plate 43. This spring seating plate 43 has a similar depression and the movable plate is thereby centered so as to oscillate or move about a vertical axis centrally through the post and cradle. A light spring 44 is mounted in the depression in the movable seating plate 43 and engages an abutment plate 45 at its upper end. This abutment plate engages a shoulder formed on the pivot post and cross webs 46 are provided to reinforce the abutment plate. Also located in the chamber formed within the hollow pivot post and cradle is a spring 47 which rests on the flange of the movable seating plate at the lower end and bears against the abutment plate 45 at its upper end. This movable seating plate allows the cradle to turn on the pivot post about a vertical axis. The movable seating plate also maintains the springs out of contact for free movement under load.

The vertical post can move up and down in the cradle due to the variations in the load, and the cradle, as noted above, swings about the vertical axis centrally of the post when the truck turns so that the wheels may follow curved tracks. The cradle can oscillate by the movement of the cradle along the curved supporting plate 14. This permits the truck to oscillate about a horizontal axis and in a vertical plane extending longitudinally of the truck frame. The cylindrical surface of the plate 14 and the cylindrical surface of the plate 41 provides some clearance for endwise movement of the truck relative to the pivot post and car frame in case of severe shock, such as coupling two cars together. If the truck moves a slight distance bodily relative to the pivot post the car body is raised due to the movement of the plate 41 up the curved surface of supporting plate 14. Therefore, the weight of the car, plus the friction of the bottom of the cradle against the supporting plate 14, tends to relieve sudden endwise shocks, such as coupling, quick application of brakes, or in case where the wheels strike a buffer at the dead end of a track, or a derailer. While the truck body may move bodily on the cradle, and the cradle may oscillate with the truck in a vertical plane extending longitudinally of the truck frame, the truck frame has no bodily lateral or transverse movement on the pivot post. Owing to the fact that the pivot posts are rigidly attached to the bolster and the bolster is constructed so as to withstand torsional and bending strains, the trucks will be maintained by the pivot posts in vertical planes perpendicular to the plane of the body of the car. The bolster can move up and down on the truck frame, the truck frame can turn about a vertical axis centrally of the pivot post, and the truck frame can also oscillate about a horizontal axis, due to the cradle shifting on the cylindrical support therefor.

Connected to the abutment plate 45 is a pipe 48 which extends up through the bolster and is provided with a cap 49 for closing the upper end thereof. Oil may be supplied to the chamber within the pivot post through this pipe. The chamber is partially filled with oil, preferably to the level indicated by the broken line a, a in Fig. 10. The cap 49 may have a small air vent therein, but otherwise the chamber is closed, due to the fact that the cradle and the pivot post are machined to have a close fit. Air is, therefore, trapped within the chamber between the abutment plate 45 and the surface of the oil. When the pivot post moves down into the cradle, due to increased load, the air will be compressed. This air space above the oil partially relieves any sudden impact on the springs and the air vent will serve to equalize the pressure and maintain the atmospheric condition above the oil level when the springs are not in action.

The wall of the cradle is provided with an annular recess in which is placed an inverted U-packing 50. This U-packing will prevent or reduce to a minimum the oil passing up along the outer wall of the pivot post, and between said wall and the inner wall of the cradle. Just above the U-packing are ports 51 which allow the oil to escape into the chamber surrounding the cradle and within the housing formed by the side plates and the cross plate. The oil can move freely inward past the U-packing, so that when the inner chamber is brought to atmospheric pressure, the oil leaking out will flow back into the inner chamber and establish a common level for the oil in the two chambers. The oil in this inner chamber not only serves to provide an air cushion, but it also lubricates the movable seating plates for the springs and permits the free turning of the truck on the bolster about a vertical axis. The oil will also lubricate the springs and will lubricate the wall between the cradle and the pivot post, and further establish a free movement of the pivot post vertically within the cradle, and the oil in the outer chamber will lubricate the bottom plate of the cradle and the supporting plate therefor, so that the truck support may easily oscillate about a horizontal axis and in a vertical plane longitudinally of the truck. In order to close the outer chamber of the cradle, a rubber dust cap 52 is provided. This dust cap is shown in detail in Figures 10, 11 and 12. It consists of a flanged portion 53 which engages underneath the flange 12 of the collar 11, and thus the cap is firmly secured to the truck frame. The cap is also provided with a thickened ring portion 54 at the upper end thereof which has an inwardly projecting rib 55. This rib engages a recess in the pivot post just below the bolster and this serves to fixedly secure the upper portion of the cap to the pivot post. When the pivot post moves down into the cradle, this thickened portion of the cap will lie between the upper end of the cradle and the bolster. This rubber shield or cap with the large mass of rubber at the upper edge portion thereof serves as a striking surface for the end of the cradle in case of excessive impact when the car is heavily loaded. The length of the cradle is sufficient to compress the rubber to a considerable extent before the springs are flat. Except under very abnormal conditions, the rubber will not be compressed to the full extent, and therefore, the coiled springs will rarely become flat or solid. This is a great protection to the springs and permits the use of a lighter spring with increased travel for a given diameter of spring material. This reduces the cost of the springs and the riding quality of the car is improved.

Figure 1:
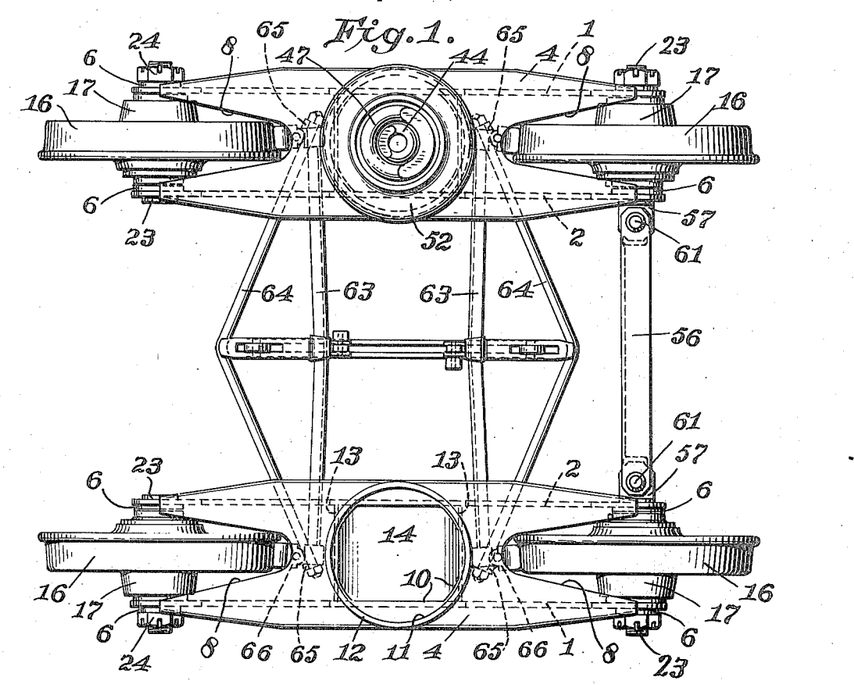
Figure 1 is a plan view showing opposed connected wheel trucks and showing the dust guard and springs in place on one of said truck frames.
Figure 2:
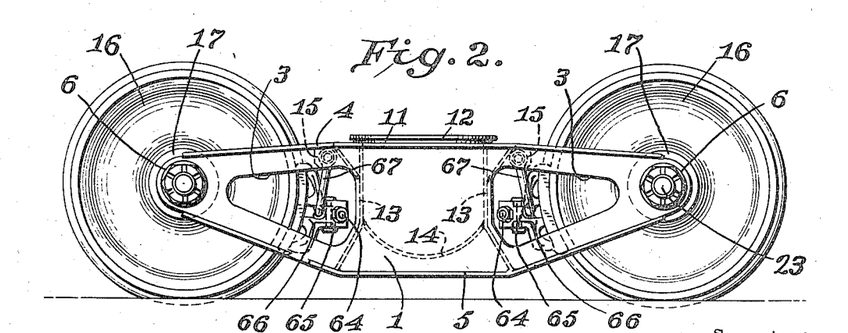
Fig. 2 is a side view of one of the wheel trucks.

As above noted, there is no axle connecting the wheels of the opposed trucks. The trucks are independently mounted and can move up and down independently and also oscillate in a vertical plane independently. There is, however, a tie bar connecting the trucks at the opposite sides of the frame, so that the turning of one about a vertical pivot will bring about a corresponding vertical movement in the other. This tie bar is shown in Figures 1 and 15 and is indicated therein by the numeral 56. The spindles 33 of one pair of the opposed wheels in the trucks are connected by this tie bar. The spindle is provided with a projecting portion 57 which is provided with an opening therethrough. Disposed in this opening is a rubber bushing 58 having a metal tubing 59 molded therein. This bushing is provided with a projecting flange 60, and the bushing is shaped so as to fit in the opening in the projecting member 57 and overlies and rests on the projecting member. The tie bar is preferably of channel form in cross section and consists of a side plate joining top and bottom plates, so as to produce a U-channel structure which is very strong and not liable to buckle under compression. The top and bottom plates are spaced so as to project over the top and bottom faces of the projecting member 57. A headed pivot pin 61 is inserted through openings in the top and bottom plates and through the tube 59 of the bushing 58. A nut 62 is threaded on to the lower end of the pivot pin. This joins the tie bar at its opposite ends to the wheel spindles and thus the truck frames are connected so that any movement of one about the vertical pivot will cause a similar movement in the other. This rubber bushing takes up all play and provides a practically noiseless connection between the tie bar and the spindles. It will also yield to a slight extent and permit free and independent oscillations of the truck frames.

The braking mechanism includes a brake beam associated with each pair of wheels, and the brake beam, as shown, is of the usual truss brake beam type. It consists of a compression member 63 and a tension member 64. Mounted at the opposite ends of the member 63 are brake head supporting brackets 65 which are rigidly attached to said member 63. The tension member 64 extends through the supporting bracket 65. Pivotally mounted on each supporting bracket is a brake head 66 which carries a brake shoe. The brake beam is supported from the hangers 15 by links 67.

While the invention described in detail is applied to a truck frame as used in a car having wheels with flanges adapted to run on tracks, it will be understood that from certain aspects of the invention, the truck frame may be used with other types of wheels and in connection with any type of vehicle adapted for carrying heavy loads. The truck frame being made of plates rigidly connected so as to provide a box-like structure, may be made very light without sacrificing strength and durability. The mounting of the wheels on independent spindles and the constructing of the bearings for the wheels so that it may be assembled in the hub of the wheel and form a unit therewith, not only lightens the wheel structure, but it also provides a wheel mounting whereby the wheel may be quickly demounted and replaced and the bearings may be assembled in the wheel hub at the shop and properly packed with grease for attachment to the truck. The use of a hollow beam structure for the bolster with the pivot posts rigidly attached thereto provides a structure which is very strong and which is light in weight and wherein the wheel trucks will be maintained in planes perpendicular to the plane of the underframe. The mounting of the bolster pivot post in the cradle in the truck provides a very simple and efficient means whereby the bolster may be moved vertically in each truck, the truck turn about a vertical axis on the pivot post, and wherein the truck frame may also turn about a horizontal axis on the cradle. The forming of the pivot post of hollow construction and the close fitting of the same to the cradle, not only houses the springs and prevents dust and dirt from accumulating thereon, but it also provides a chamber which may be provided with a lubricant for lubricating all of the contacting parts as well as creating an air cushion which greatly increases the riding qualities and also enables lighter springs to be used. The providing of a dust cap for the cradle not only houses the parts within the cradle, preventing dirt from contacting therewith, but this dust cap being made of rubber, serves as a cushion in case of excessive loads which greatly aids in protecting the springs from completely collapsing under overload.

Figures 19, 21:
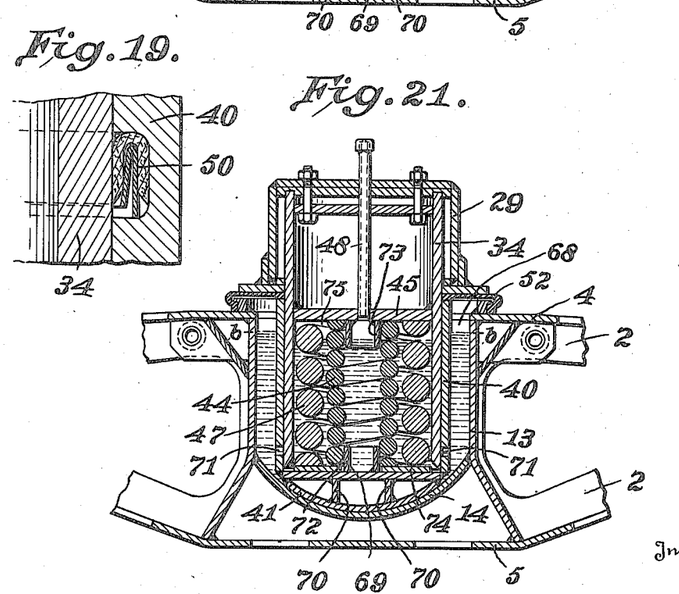
Fig. 19 is an enlarged detail showing the oil seal between the pivot post and the cradle.
Fig. 21 is a view similar to Fig. 20, but showing the car loaded and the springs compressed under maximum impact load.
Figure 20:
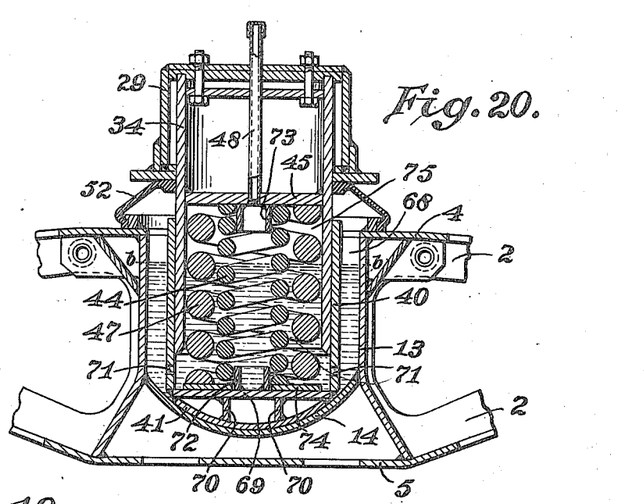
Fig. 20 is a vertical sectional view showing a slightly modified form of mounting between the bolster and the truck frame, and with the parts as positioned when the car is free from load.

The modified form of structure shown in Figures 20 and 21 will now be described. The bolster 29 is of the construction described in detail above and the reference numerals used in the detail description thereof and of the pivot post 34, have been applied to these figures. The truck frame is also of the construction described in detail above and includes side plates 1 and 2 which are connected by a top plate 4 and a bottom plate 5. Extending across the truck frame is a curved supporting plate 14 and cross partition plates 13, 13 which forms between the side plates 1 and 2, a chamber 68. Mounted in this chamber is the cradle 40 which is slightly different in construction from that shown in the earlier figures. The cradle has a bottom plate 69 which extends across from one side thereof to the other. Attached to this plate 69 is the curved plate 41 which forms the bottom of the cradle. This curved plate 41 rests on the curved supporting plate 14 and moves along the same in the manner described above. Between this plate 41 and the plate 69 are reinforcing webs 70, 70. These parts are all welded together and to the cradle so as to form a rigid structure therewith.

The depending pivot post 34 is machined on its exterior so as to fit closely the interior machined surface of the cradle 40. While the pivot post is free to move vertically in the cradle and the cradle is free to oscillate on the pivot post, there is, however, a substantially liquid-tight joint between the two surfaces. A series of ports 71 are formed through the wall of the cradle a slight distance above the bottom plate 69. The bottom plate 69 has an upwardly projecting hollow pivot post 72. The abutment plate 45 is likewise provided with a hollow pivot post 73. The inner spring 44 is centered by these hollow pivot posts and bears against a seating plate 74 at its lower end and the abutment plate at its upper end. A heavy spring 47 surrounds the smaller spring and bears against the seating plate 74 at its lower end and the abutment plate 45 at its upper end. The pivot post and the cradle form a chamber 75 which is connected to the chamber 68 through the ports 71, 71 when these ports are open. When the car is light or free from load, the parts take the position shown in Fig. 20. Lubricating oil may be supplied to the chamber 75 through the pipe 48. The oil will seek a common level in the chamber 75, and this level is indicated by the line b—b (Fig. 20). When the car is loaded, the springs will be compressed and the pivot post sliding down in the cradle will cover the ports 71, thus closing the inner chamber 75 and providing a dead air space in said spring chamber above the oil level. The compressing of the air in said chamber reduces the load on the spring and serves to reduce the shock of the car body coming against the outer rubber shield or cover 52. In Fig. 21, the parts are shown as positioned by excessive impact load or slam, due to the movement of the truck over a crossing or rough section in the track while heavily loaded. This action also tends to break up the simple harmonic motion of the springs and prevents the bouncing of the car when traveling at high speed. As soon as the spring lifts the bolster to a position to uncover the ports 71, 71, then the oil will return to the common level, owing to the fact that the oil supply pipe 48 has a cap with a vent hole in it, permitting the inner chamber to return to atmospheric pressure. This vent opening, however, is so small, that under sudden impact movements there is little or no escape of air from the chamber 75, and it will be compressed in the dead air space, said compressing of the air increasing as soon as the escape of oil from the inner chamber to the outer chamber is cut off by closing the ports 71.

It is obvious that minor changes may be made in the details of construction and the arrangement of the parts without departing from the spirit of the invention as set forth in the appended claims.

Having thus described the invention, what I claim as new and desire to secure by Letters-Patent, is—

1. A vehicle truck having wheels arranged in tandem, comprising spaced side plates having alined openings adjacent each end thereof adapted to support spindles parallel to each other on which the wheels are mounted, top and bottom plates rigidly connected to said side plates and forming a hollow boxlike structure, and a cross plate joining the side plates adjacent the center thereof and forming a support for a truck body bolster, said top plate having an opening therethrough to receive the bolster mounting.

2. A vehicle truck having wheels arranged in tandem comprising spaced side plates having alined openings adjacent each end thereof adapted to support spindles parallel to each other on which the wheels are mounted, a bottom plate extending from one side plate to the other and substantially from one spindle to the other spindle and having the end portions thereof bifurcated to form a clearance space for the wheels, a top plate extending from one side plate to the other and substantially from one spindle to the other and having bifurcated portions between the side plates to form a clearance space for the wheels, said top plate centrally of the truck frame being extended beyond the side plates and having an opening centrally thereof adapted to receive the body bolster mounting, and a cross plate joining said side plates beneath the opening in the top plate and serving as a support for the mounting.

3. A vehicle truck having wheels arranged in tandem comprising spaced side plates having alined openings adjacent each end thereof adapted to support spindles parallel to each other on which the wheels are mounted, a bottom plate extending from one side plate to the other and substantially from one spindle to the other spindle and having the end portions thereof bifurcated to form a clearance space for the wheels, a top plate extending from one side plate to the other and substantially from one spindle to the other and having bifurcated portions between the side plates to form a clearance space for the wheels, said top plate centrally of the truck frame being extended beyond the side plates and having an opening centrally thereof adapted to receive the body bolster mounting, and a cross plate joining said side plates beneath the opening in the top plate and serving as a support for the mounting, all of said plates being of rolled steel and connected by welding for forming a rigid boxlike structure wherein the axes of the said spindles are held in parallel relation to each other.

4. A vehicle truck comprising spaced side plates having alined openings adjacent each end thereof, top and bottom plates rigidly connected to said side plates forming a hollow boxlike structure, a cross plate joining the side plates adjacent the center thereof and forming a support for a truck body bolster, said top plate having an opening therethrough to receive the bolster mounting, a spindle at each end of the side plates mounted in the alined openings therein, a wheel mounted on each spindle, and anti-friction bearings between each wheel and its supporting spindle.

5. A vehicle truck comprising spaced side plates having alined openings adjacent each end thereof, top and bottom plates rigidly connected to said side plates forming a hollow boxlike structure, a cross plate joining the side plates adjacent the center thereof and forming a support for a truck body bolster, said top plate having an opening therethrough to receive the bolster mounting, a spindle at each end of the side plates mounted in the alined openings therein, a wheel mounted on each spindle, anti-friction bearings between each wheel and its supporting spindle, said top and bottom plates extending from substantially one spindle to the other and having bifurcated portions forming clearance spaces between the side plates for said wheels.

6. A vehicle truck comprising spaced side plates having alined openings adjacent each end thereof, top and bottom plates rigidly connected to said side plates forming a hollow boxlike structure, a cross plate joining the side plates adjacent the center thereof and forming a support for a truck body bolster, said top plate having an opening therethrough to receive the bolster mounting, a spindle at each end of the side plates mounted in the alined openings therein, a wheel mounted on each spindle, and anti-friction bearings between each wheel and its supporting spindle, said top and bottom plates extending from substantially one spindle to the other and having bifurcated portions forming clearance spaces between the side plates for said wheels, all of said plates being of rolled steel and connected together by welding.

7. A vehicle comprising an underframe, a bolster connected to said underframe, a truck at each end of the bolster on which said bolster and underframe are mounted, a tie bar connecting said trucks, each truck including parallel side plates spaced from each other and having alined openings adjacent each end thereof, a top and bottom plate connecting the side plates, a spindle at each end of the truck mounted in the alined openings in the side plates, a wheel mounted on each spindle, an anti-friction bearing between the wheel and its supporting spindle, and means carried by the side plates on which the bolster mounting is supported so that said truck can turn about a vertical axis in a vertical plane longitudinally of the truck, said bolster mounting including means whereby the bolster may move vertically relative to the truck and the truck turn about a vertical axis on the bolster.

8. A vehicle comprising an underframe, a bolster rigidly connected thereto, a depending pivot post rigidly attached to the bolster adjacent each end thereof, a truck mounted on each pivot post, a tie bar connecting said trucks, each truck including parallel side plates spaced from each other, a top and bottom plate connecting said side plates, spindles carried at the outer ends of said side plates, a wheel mounted on each spindle, and means carried by said truck in which the pivot post is mounted, said means being constructed so as to permit the bolster to move vertically relative to the trucks and to permit each truck to turn about a vertical axis centrally of its pivot post and means carried by the truck and supporting said pivot post mounting means whereby each truck is permitted to turn independently about a horizontal axis in a vertical plane longitudinally of the truck.

9. A vehicle comprising an underframe, a bolster, a depending pivot post at each end of the bolster, a truck mounted on each pivot post, said truck including a truck frame having a boxlike portion centrally thereof, a cradle disposed within said boxlike portion adapted to receive the pivot post so that the truck and cradle can oscillate about the pivot post and the pivot post move into and out of the cradle, and means for supporting said cradle in said truck frame whereby the truck frame may move about a horizontal axis in a vertical plane longitudinally of the truck.

10. A vehicle including a bolster, a hollow pivot post depending therefrom and rigidly connected to said bolster, a truck including a truck frame having wheels mounted thereon in tandem, a cradle disposed within and carried by said truck frame and having telescoping engagement with said depending pivot post, springs positioned within said hollow pivot post and said cradle for supporting said bolster, said cradle being constructed so as to fit the pivot post, move vertically relative thereto and oscillate about said pivot post, and means for supporting said cradle in said truck frame so that said truck may turn about a horizontal pivot in a vertical plane longitudinally of the truck.

11. A vehicle including a bolster, a hollow pivot post depending therefrom and rigidly connected to said bolster, a truck having wheels mounted thereon in tandem, a cradle carried by said truck and having telescoping engagement with said depending pivot post, said cradle being fitted to said pivot post so as to move vertically relative thereto and to rotate about the same, a spring seat mounted in the cradle for free rotation about said vertical axis, an abutment plate in said post, and springs interposed between said spring seat and the abutment plate, said cradle and said hollow post providing a closed chamber which may be partially filled with oil for lubricating the parts within said closed chamber and for providing an air cushion to prevent sudden unrestrained movements of the bolster in the cradle.

12. A vehicle including a bolster, a hollow pivot post depending therefrom and rigidly connected to said bolster, a truck having wheels mounted thereon in tandem, a cradle carried by said truck and having telescoping engagement with said depending pivot post, said cradle being fitted to said pivot post so as to move vertically relative thereto and to rotate about a vertical axis on the same, a spring seat mounted in the cradle for free rotation about said vertical axis, an abutment plate in said post, springs interposed between said spring seat and the abutment plate, said cradle and said hollow post providing a closed chamber which may be partially filled with oil for lubricating the parts within said closed chamber and for providing an air cushion to prevent sudden unrestrained movements of the bolster in the cradle, a filler pipe leading from said chamber whereby oil may be supplied thereto, and a vent cap for said pipe.

13. A vehicle including a bolster, a hollow pivot post depending therefrom and rigidly connected to said bolster, a truck having wheels mounted thereon in tandem, a cradle carried by said truck and having telescopic engagement with said depending pivot post, said cradle being fitted to said pivot post so as to move vertically relative thereto and to rotate about a vertical axis on the same, a spring seat mounted in the cradle for free rotation about said vertical axis, an abutment plate in said post, springs interposed between said spring seat and the abutment plate, said cradle and said hollow post providing a closed chamber which may be partially filled with oil for lubricating the parts within said closed chamber and for providing an air cushion to prevent sudden unrestrained movements of the bolster in the cradle, a filler pipe leading from said chamber whereby oil may be supplied thereto, a vent cap for said pipe, a U-packing located between the contacting walls of the cradle and pivot post and disposed so as to restrain the escape of oil from said chamber, said cradle having a port formed through the wall thereof and above the U-packing, and a chamber in said truck surrounding the cradle adapted to contain lubricating oil extending to a level above said port whereby the oil in the chamber within the pivot post will return to a normal level when the vehicle is free from load.

14. A vehicle comprising a bolster, a truck, means for connecting said bolster to said truck including a depending pivot post rigidly carried by said bolster, a cradle having telescoping connections with said pivot post, the lower end of said cradle being curved about an axial line disposed in the center of the pivot post and at right angles to the longitudinal plane of the truck, a supporting plate carried by the truck on which said cradle rests, said plate being curved about the same axial line and of greater length than the curved plate of the cradle whereby said supporting plate may travel along the cradle and the truck oscillate about said axial line.

15. A vehicle comprising a bolster, a truck, means for connecting said bolster to said truck including a depending pivot post rigidly carried by said bolster, a cradle having telescoping connections with said pivot post, the lower end of said cradle being curved about an axial line disposed in the center of the pivot post and at right angles to the longitudinal plane of the truck, a supporting plate carried by the truck on which said cradle rests, said plate being curved about the same axial line and of greater length than the curved plate of the cradle whereby said supporting plate may travel along the cradle and the truck oscillate about said axial line, said truck having parallel side members contacting with said cradle and preventing said truck from movement transversely.

16. A vehicle comprising a bolster, a truck, means for connecting said bolster to said truck including a depending pivot post rigidly carried by said bolster, a cradle having telescoping connections with said pivot post, the lower end of said cradle being curved about an axial line disposed in the center of the pivot post and at right angles to the longitudinal plane of the truck, a supporting plate carried by the truck on which said cradle rests, said plate being curved about the same axial line and of greater length than the curved plate of the cradle whereby said supporting plate may travel along the cradle and the truck oscillate about said axial line, said truck having side members disposed so as to prevent any relative transverse movement between the cradle and the truck and so as to permit bodily shifting of the truck on the cradle in a direction longitudinally of the truck.

17. A vehicle comprising a bolster, a depending pivot post rigidly connected to said bolster, a truck associated with said pivot post and including spaced side plates, wheels supported in tandem on said side plates, a top plate connecting said side plates, a bottom plate connecting said side plates, said top plate having a central opening therein through which said pivot post extends, a cradle having telescoping engagement with said pivot post disposed between said side plates and beneath said top plate, a supporting plate carried by the side plates on which said cradle rests, a rubber dust cap connected to said top plate surrounding said opening and connected at its lower end to said top plate and at its upper end to said pivot post, and springs disposed within said cradle and pivot post on which said bolster rests.

18. A vehicle comprising a bolster, a depending pivot post rigidly connected to said bolster, a truck associated with said pivot post and including spaced side plates, wheels supported in tandem on said side plates, a top plate connecting said side plates, a bottom plate connecting said side plates, said top plate having a central opening therein through which said pivot post extends, a cradle having telescoping engagement with said pivot post disposed between said side plates, a supporting plate carried by the truck on which said cradle rests, a rubber dust cap connected to said top plate surrounding said opening and connected at its lower end to said top plate and at its upper end to said pivot post, and springs disposed within said cradle and pivot post on which said bolster rests, the inner upper edge of said dust cap being thickened and disposed between the upper end of the cradle and the bolster and serving as a cushioning member for restraining the movement of the bolster relative to the cradle.

19. A vehicle comprising a bolster, a depending hollow pivot post rigidly attached to said bolster, a cradle telescoping said pivot post and having a relatively tight frictional engagement therewith, a truck having side members spaced from each other and adapted to receive therebetween said cradle, a supporting plate carried by said side plates on which said cradle rests, said supporting plate and the bottom of said cradle being curved about a common axial line spaced centrally of the truck and extending in a direction at right angles to a vertical plane passing longitudinally through the truck, a spring seating plate within said cradle and having a central depression therein, a spring seating member having a portion fitting said depression so that said spring seating member may rotate freely on said supporting plate, an abutment plate within said pivot post, a heavy spring within the pivot post contacting with said abutment plate and said spring seating plate, and a relatively lighter spring located within the heavy spring and contacting with said abutment plate and seated in a depression in the spring seating member.

20. A vehicle comprising a bolster, a depending hollow pivot post rigidly attached to said bolster, a cradle telescoping said pivot post and having a relatively tight frictional engagement therewith, a truck having side members spaced from each other and adapted to receive therebetween said cradle, a supporting plate carried by said side plates on which said cradle rests, said supporting plate and the bottom of said cradle being curved about a common axial line spaced centrally of the truck and extending in a direction at right angles to a vertical plane passing longitudinally through the truck, a spring seating plate within said cradle and having a central depression therein, a spring seating member having a portion fitting said depression so that said spring seating member may rotate freely on said supporting plate, an abutment plate within said pivot post, a heavy spring within the pivot post contacting with said abutment plate and said spring seating plate, a relatively lighter spring located within the heavy spring and contacting with said abutment plate and seated in a depression in the spring seating member, a pipe connected to said abutment plate and extending up through said bolster whereby oil may be supplied to the chamber within the pivot post and cradle, and an air vent cap attached to the end of said pipe for restraining the flow of air from the chamber and providing an air cushion in the upper part of the chamber.

21. A vehicle comprising a bolster, a depending hollow pivot post rigidly attached to said bolster, a cradle telescoping said pivot post and having a relatively tight frictional engagement therewith, a truck having side members spaced from each other and adapted to receive therebetween said cradle, a supporting plate carried by said side plates on which said cradle rests, said supporting plate and the bottom of said cradle being curved about a common axial line spaced centrally of the truck and extending in a direction at right angles to a vertical plane passing longitudinally through the truck, a spring seating plate within said cradle and having a central depression therein, a spring seating member having a portion fitting said depression so that said spring seating member may rotate freely on said supporting plate, an abutment plate within said pivot post, a heavy spring within the pivot post contacting with said abutment plate and said spring seating plate, a relatively lighter spring located within the heavy spring and contacting with said abutment plate and seated in the depression in the spring seating member, a pipe connected to said abutment plate and extending up through said bolster whereby oil may be supplied to the chamber within the pivot post and cradle, an air vent cap attached to the end of said pipe for restraining the flow of air from the chamber and providing an air cushion in the upper part of the chamber, and a U-packing located in the adjacent walls of the cradle and the pivot post and disposed so as to restrain the leakage of oil from said chamber.

22. A vehicle comprising a bolster, a depending hollow pivot post rigidly attached to said bolster, a cradle telescoping said pivot post and having a relatively tight frictional engagement therewith, a truck having side members spaced from each other and adapted to receive therebetween said cradle, a supporting plate carried by said side plates on which said cradle rests, said supporting plate and the bottom of said cradle being curved about a common axial line spaced centrally of the truck and extending in a direction at right angles to a vertical plane passing longitudinally through the truck, a spring seating plate within said cradle and having a central depression therein, a spring seating member having a portion fitting said depression so that said spring seating member may rotate freely on said supporting plate, an abutment plate within said pivot post, a heavy spring within the pivot post contacting with said abutment plate and said spring seating plate, a relatively lighter spring located within the heavy spring and contacting with said abutment plate and seated in a depression in the spring seating member, a pipe connected to said abutment plate and extending up through said bolster whereby oil may be supplied to the chamber within the pivot post and cradle, an air vent cap attached to the end of said pipe for restraining the flow of air from the chamber and providing an air cushion in the upper part of the chamber, a U-packing located in the adjacent walls of the cradle and the pivot post and disposed so as to restrain the leakage of oil from said chamber, said truck having a chamber surrounding said cradle and forming a chamber for lubricating oil, and a port extending from the cradle above said U-packing and serving to establish a common level with the oil in said chambers when the bolster is freed from load.

23. A vehicle including a bolster having a depending pivot post rigidly connected thereto at each end thereof, a truck mounted on each pivot post with the wheels of the trucks in tandem, a tie bar connecting said trucks, said tie bar being of hollow channel structure, means for pivotally connecting the ends of said tie bar with the respective trucks including a pivot pin, and an elastic bushing surrounding said pivot pin.

24. A vehicle comprising a bolster, a depending pivot post rigidly attached to each end of said bolster, a truck at each end of said bolster having the wheels thereof arranged in tandem, means for connecting each truck to its respective pivot post whereby said truck may turn about said pivot post as an axis and whereby said truck may turn about a horizontal axis centrally of the pivot post, a tie bar connecting from one truck to the other, a pivot pin connecting the ends of the tie bar with the respective trucks, and an elastic bushing surrounding the pivot pin, said bushing yielding to permit said trucks to swing independently on their horizontal axes.

25. A vehicle comprising a bolster, a truck disposed at each end of said bolster, means for connecting each truck to the bolster so that the truck may turn about a vertical axis on the bolster and a horizontal axis parallel with the bolster, each truck having side plates, spindles mounted at the outer ends of said side plates, wheels mounted on said spindles, a tie bar connecting the spindles of the opposed wheels at one end of the trucks, a pivot pin joining the tie bar to the respective spindle, and an elastic bushing surrounding the pivot pin, said bushing forming a connection between the pivot pin and link and yielding to permit said trucks to oscillate independently on their horizontal axes.

26. A vehicle including a bolster, a hollow pivot post depending therefrom and rigidly connected to the bolster, a truck frame having wheels mounted thereon in tandem, a cradle carried by the truck frame and having telescoping engagement with the depending post, springs located within said hollow pivot post and said cradle for supporting said bolster, said cradle and hollow post providing a closed chamber, said truck frame having a supporting plate for said cradle and cross partitions forming a chamber surrounding said cradle, ports in the walls of the cradle adjacent the lower end thereof and beneath the lower end of the pivot post when the vehicle is free from load, said chamber within the pivot post and cradle and said chamber surrounding the cradle being provided with a lubricating oil, the level of which is above the lower end of the pivot post, said pivot post operating under excessive load to close the ports in the wall of the cradle so as to provide a confined air chamber within the pivot post for absorbing the shock incident to excessive impact load.

27. A vehicle comprising a bolster, a pivot post rigidly connected to the bolster and depending therefrom, a body supporting member having telescoping connection with the outer face of the pivot post and housing the lower end thereof, said body supporting member being mounted on the pivot post so as to move vertically relative thereto and turn about the axis of the pivot post, cushioning means between the pivot post and the body supporting member for cushioning the relative movements therebetween, a truck frame, wheels mounted thereon in tandem, and means whereby said body supporting member is connected to said truck frame intermediate the ends thereof so that the truck frame may oscillate about a horizontal axis on said body supporting member.

28. A vehicle comprising a bolster, a hollow pivot post rigidly connected to said bolster and depending therefrom, a body supporting member having telescoping connection with the outer face of said post and housing the lower end thereof so as to form a closed chamber within said post, said body supporting member being mounted on the pivot post so as to move vertically relative to thereto and to turn about the axis of the pivot post, spring means disposed in said chamber between the post and the body supporting member for cushioning the relative vertical movements therebetween, a truck frame, wheels mounted thereon in tandem, and means whereby said supporting member is connected to said truck frame intermediate the ends thereof so that said truck frame may oscillate about a horizontal axis on said body supporting member.

29. A vehicle comprising a bolster, a hollow pivot post rigidly connected to the bolster and depending therefrom, said hollow pivot post being closed at its upper end and open at its lower end, a body supporting member having telescoping engagement with the outside of said post and closing the lower end thereof, said body supporting member having a tight frictional engagement with said post, said body supporting member being free to move vertically relative to said post and to turn about the axis of said post, spring means located in said hollow post for cushioning the relative movements between the body supporting member and said post, a truck frame, wheels mounted thereon in tandem, and means whereby said supporting member is connected to said truck frame intermediate the ends thereof so that said truck frame may oscillate about a horizontal axis on said body supporting member.

HENRY FORT FLOWERS.